(12) United States Patent
Hsiao et al.

(10) Patent No.: US 9,269,025 B1
(45) Date of Patent: Feb. 23, 2016

(54) OBJECT DETECTION IN IMAGES

(71) Applicant: YAHOO! INC., Sunnyvale, CA (US)

(72) Inventors: Jen-Hao Hsiao, Taipei (TW); Jia Li, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/609,220

(22) Filed: Jan. 29, 2015

(51) Int. Cl.
*G06K 9/00* (2006.01)
*G06K 9/62* (2006.01)
*G06K 9/64* (2006.01)

(52) U.S. Cl.
CPC ............ *G06K 9/6245* (2013.01); *G06K 9/6212* (2013.01); *G06K 9/64* (2013.01)

(58) Field of Classification Search
USPC ............... 382/170, 181.103; 250/332, 341.1, 250/358.1; 324/301; 348/246, 340, E5.081; 356/51; 600/407, 409; 375/349; 702/160
See application file for complete search history.

(56) References Cited

U.S. PATENT DOCUMENTS

| | | | | | |
|---|---|---|---|---|---|
| 7,053,942 | B2 * | 5/2006 | Pine | ...................... | H04N 5/2176 348/246 |
| 7,119,339 | B2 * | 10/2006 | Ferguson | ........... | G01N 21/3581 250/332 |
| 8,847,592 | B2 * | 9/2014 | Goodwill | ................. | A61B 5/05 324/301 |

OTHER PUBLICATIONS

Wikipedia.com, "Local Binary Patterns", http://en.wikipedia.org/wiki/Local_binary_patterns, printed on Jan. 23, 2015, 4 pages.
Wikipedia.com, "Histogram of Oriented Gradients" http://en.wikipedia.org/wiki/Histogram_of_oriented_gradients, printed on Jan. 23, 2015, 7 pages.
Viola et al., "Rapid Object Detection Using a Boosted Cascade of Simple Features" Accepted Conference on Computer Vision and Pattern Recognition dated 2001, 9 pages.
Sermanet et al., "OverFeat: Integrated Recognition, Localization and Detection Using Convolutional Networks" dated Feb. 24, 2014, 16 pages.
Huang et al., "Local Binary Patterns and It's Application to Facial Image Analysis: A Survery", IEEE Transactions on (vol. 41 , Issue: 6 ), dated Mar. 28, 2011, 17 pages.
Girshick et al., "Rich Feature Hierarchies for Accurate Object Detection and Semantic Segmentation" Tech Report (v5), dated Oct. 22, 2014, 21 pages.

(Continued)

*Primary Examiner* — Anh Do
(74) *Attorney, Agent, or Firm* — Hickman Palermo Becker Bingham LLP (57) ABSTRACT

In an embodiment, a method comprises obtaining a frequency domain representation associated with an image; obtaining one or more frequency domain representations of one or more object detection filters; generating a composite frequency domain representation based on the frequency domain representation associated with the image and the one or more frequency domain representations of the one or more object detection filters; and detecting one or more objects in the image based on the composite frequency domain representation. The frequency domain representation associated with the image may be obtained based on a forward transform performed on an image feature description. The image feature description may be obtained based on a feature extraction performed on the image. The one or more frequency domain representations of the one or more object detection filters may be obtained based on one or more Fourier transforms performed on the one or more object detection filters.

24 Claims, 7 Drawing Sheets

(56) References Cited

OTHER PUBLICATIONS

Dalal et al., "Histograms of Oriented Gradients for Human Detection" Computer Vision and Pattern Recognition, 2005. CVPR 2005. IEEE Computer Society Conference, dated Jun. 2005 (vol. 1 ), 8 pages.

Achanta et al., "Frequency-Turned Salient Region Detection" Computer Vision and Pattern Recognition, 2009. CVPR 2009. IEEE Conference, dated Jun. 2009, 8 pages.

* cited by examiner

| TABLE 500 | | | | |
|---|---|---|---|---|
| ROW IN THE MATRIX 502 | COLUMN IN THE MATRIX 504 | VALUE IN THE MATRIX 506 | THRESHOLD VALUE 508 | OBJECT DETECTION 510 |
| 1 | 1 | 3 | 8 | NO |
| 1 | 2 | 9 | 8 | YES |
| 1 | 3 | 7 | 8 | NO |
| 2 | 1 | 11 | 8 | YES |
| 2 | 2 | 5 | 8 | NO |
| 2 | 3 | 8 | 8 | YES |
| 3 | 1 | 12 | 8 | YES |
| 3 | 2 | 4 | 8 | NO |
| 3 | 3 | 13 | 8 | YES |

OBJECT DETECTION IN IMAGES

FIELD OF THE DISCLOSURE

Embodiments relate to signal processing and more specifically, to object detection in images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Object detection, such as face detection, pedestrian detection, and/or car detection, has broad applications in various fields, such as surveillance, electronic commerce, advertisement, and/or autonomous driving. For example, in electronic commerce and/or advertisement, object detection may be used to identify related objects in images, such as photographs and/or video. Upon identifying related objects, a relevant recommendation and/or a targeted advertisement may be generated and/or rendered to a user.

Object detection methods may be computationally expensive, and the resulting latency in processing time may be impractical for certain computer systems, such as mobile devices. For example, a sliding-window-based method applies an object detection filter at every possible position and scale of an image in a sliding-window manner. Assuming x and y are the dimensions of the image; m and n are the dimensions of the binary classifier; k is the number of binary classifiers; and d is the number of distinct gradient directions, the algorithmic complexity of the sliding-window-based method is O(kdxymn).

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

General Overview

The rate at which objects in images are identified may be significantly increased by reducing the computational cost of object detection. One way to reduce computational costs is to decrease the processing time for the object detection algorithm by reducing the total number of inputs for a particular computation. For example, a brand logo in a digital photograph may be identified much more quickly by analyzing the entire photograph once instead of analyzing each region of the photograph multiple times. The resulting detection speed may exhibit an increase by an order of magnitude.

One of the explanations for reducing the total number of inputs is that convolving in the original signal space is equivalent to multiplication in the frequency domain. For example, the sum of the convolutions between an image and object detection filters in the space domain is equivalent to the product of the image and the object detection filters in the frequency domain. The effect may be analogous to the time saved by performing multiplications instead of repeated additions.

Figure 1:
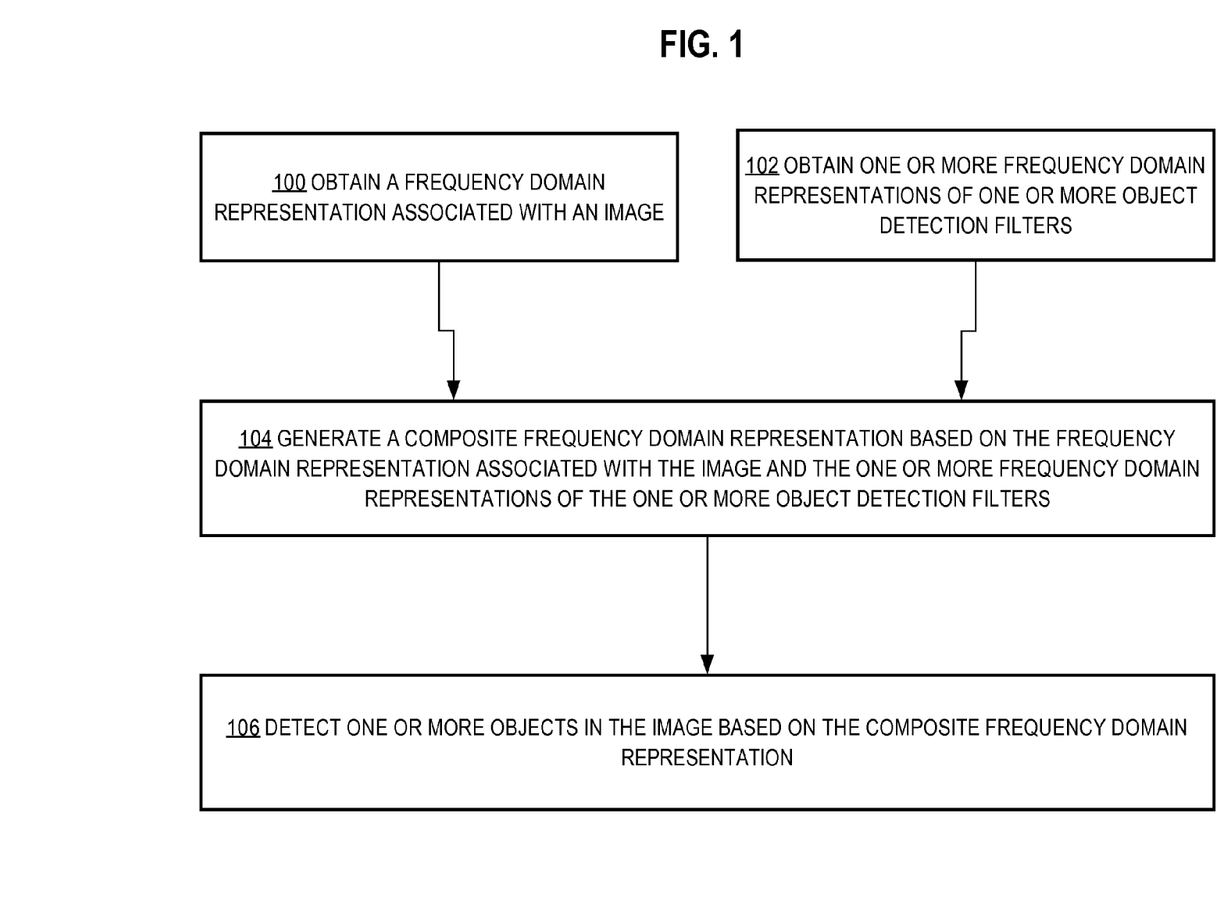
FIG. 1 is a flow diagram that depicts an approach for detecting objects in images.

FIG. 1 is a flow diagram that depicts an approach for detecting objects in images. In step 100, a frequency domain representation associated with an image is obtained. In an embodiment, the frequency domain representation may be indirectly associated with the image through an image feature description. For example, the image feature description may be obtained based on a feature extraction performed on the image, and the frequency domain representation associated with the image may be obtained based on a forward transform (e.g., Fourier transform) performed on the image feature description. In another embodiment, the frequency domain representation may be directly associated with the image. For example, the frequency domain representation associated with the image may be obtained based on a forward transform (e.g., Fourier transform) performed on the image.

Embodiments are applicable to any types of images. Example image types include, without limitation, a photograph, a drawing, a computer graphic, a video, an animation, and/or any other representation of one or more persons, places, things, and/or ideas. The image may be obtained in a format comprising a spatial domain representation, a frequency domain representation, a time domain representation, a sequential domain representation, and/or a temporal domain representation. Additionally or alternatively, an image feature description may be obtained in a format comprising a spatial domain representation, a frequency domain representation, a time domain representation, a sequential domain representation, and/or a temporal domain representation. The image feature description may comprise Histograms of Oriented Gradients ("HOGs"), Local Binary Patterns ("LBPs"), and/or any other information related to one or more features (e.g., color, intensity, edge direction) of the image.

If the image and/or the image feature description is obtained in a format other than a frequency domain representation, the frequency domain representation of the image and/or the image feature description may be generated and/or obtained from the other format of the image. As one example, the frequency domain representation of the image may be obtained by performing a forward transform on the image and/or the image feature description. Example forward transforms include, without limitation, a Fourier transform, a Z-transform, a Hilbert transform, a Laplace transform, a Wavelet transform, and/or any other means of obtaining a frequency domain representation of an image and/or an image feature description.

In step 102, one or more frequency domain representations of one or more object detection filters is/are obtained. In an embodiment, the one or more frequency domain representations of the one or more object detection filters may be obtained based on one or more forward transforms (e.g., Fourier transforms) performed on the one or more object detection filters. The one or more forward transforms performed on the one or more object detection filters may be of the same type as the forward transform performed on the image and/or the image feature description. For example, Fourier transforms may be performed on the one or more object detection filters, the image, and/or the image feature description.

The one or more object detection filters may be used to extract one or more features (e.g., Haar features, HOGs features, edge features, line features, rectangular features) from the image and/or the image feature description in a manner such that one or more objects in the image is/are detected. The one or more object detection filters may be obtained in a format comprising a spatial domain representation, a frequency domain representation, a time domain representation, a sequential domain representation, and/or a temporal domain representation. If the one or more object detection filters is/are obtained in a format other than a frequency domain representation, the one or more frequency domain representations of the one or more object detection filters may be generated and/or obtained. For example, the one or more frequency domain representations of the one or more object detection filters may be obtained by performing one or more forward transforms on the one or more object detection filters.

Together, steps 100 and 102 obtain a plurality of frequency domain representations associated with the image and the one or more object detection filters. Steps 100 and 102 may be performed in any order. For example, step 100 may be performed prior to, concurrently with, and/or subsequent to step 102. However, in an embodiment, step 102 may be performed prior to step 100 in a manner such that the overall detection time is unaffected.

In step 104, a composite frequency domain representation is generated based on the frequency domain representation associated with the image and the one or more frequency domain representations of the one or more object detection filters. The composite frequency domain representation may be generated by convolving the frequency domain representation associated with the image and the one or more frequency domain representations associated with the one or more object detection filters. Additionally or alternatively, the composite frequency domain representation may be generated by obtaining the point-wise product of the frequency domain representation associated with the image and the one or more frequency domain representations associated with the one or more object detection filters.

In step 106, one or more objects in the image is/are detected based on the composite frequency domain representation. Example objects include, without limitation, a color, a body part, an alphanumeric string, an item of clothing, and/or anything of interest in the image. The composite frequency domain representation may be represented as a matrix. The one or more objects may be detected in the frequency domain when one or more values in the matrix exceed a threshold value. Additionally or alternatively, the one or more objects may be detected by performing a reverse transform on the composite frequency domain representation. The reverse transform may comprise a means of converting a frequency domain representation to a spatial domain representation, a time domain representation, a sequential domain representation, and/or a temporal domain representation. For example, the one or more objects may be detected in the spatial domain by performing the reverse transform on the composite frequency domain representation and obtaining a detection result. The detection result may indicate the presence and/or locations of the one or more objects.

Generating Frequency Domain Representations

Figure 2A:
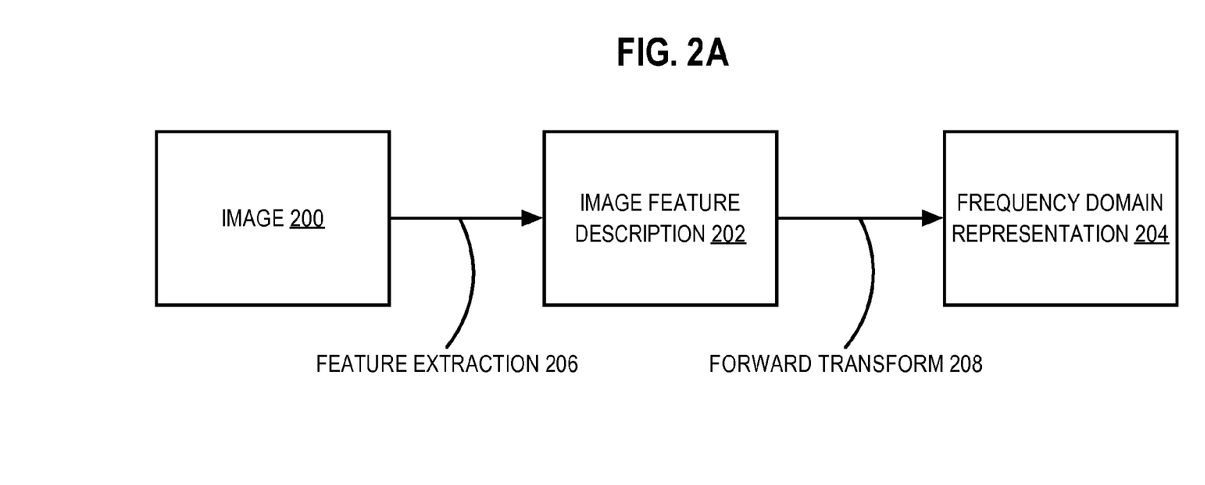
FIG. 2A is an example block diagram that depicts obtaining a frequency domain representation associated with an image.

FIG. 2A is an example block diagram that depicts obtaining a frequency domain representation associated with an image 200. In the example of FIG. 2A, an image feature description 202 of image 200 is generated by performing feature extraction 206 on image 200, and a frequency domain representation 204 is generated by performing a forward transform 208 on image feature description 202. Image 200 may be represented in one or more files, one or more frames in a video, a block of data, and/or a data stream. Image 200 may be stored in any format that may vary depending upon a particular implementation and embodiments are not limited to any particular format. Example formats include, without limitation, Joint Photographic Experts Group ("JPEG"), Portable Network Graphics ("PNG"), Graphics Interchange Format ("GIF"), Portable Document Format ("PDF"), Moving Pictures Experts Group ("MPEG"), QuickTime, and/or a raw file format.

Image feature description 202 may include one or more histograms of values associated with one or more regions of image 200. The values associated with the one or more regions of image 200 may be represented in bins, channels, and/or feature dimensions. For example, image feature description 202 may comprise one or more feature vectors, one or more feature descriptors, and/or a concatenation of histograms. Feature extraction 206 may be performed using a wide variety of techniques that may vary depending upon a particular implementation and embodiments are not limited to any particular technique for performing feature extraction. According to one embodiment, feature extraction 206 is performed by dividing image 200 into cells of pixels and/or blocks of cells, computing one or more values for each pixel in a cell, generating one or more histograms of the frequency of the one or more values in a cell, normalizing the one or more histograms, and/or concatenating the one or more histograms.

Frequency domain representation 204 may comprise a matrix, a graph, and/or a mathematical expression. Forward transform 208 may comprise a Fourier transform, such as a Fast Fourier transform ("FFT"), a discrete-time Fourier transform ("DTFT"), a discrete Fourier transform ("DFT"), and/or a circular Fourier transform.

Figure 2B:
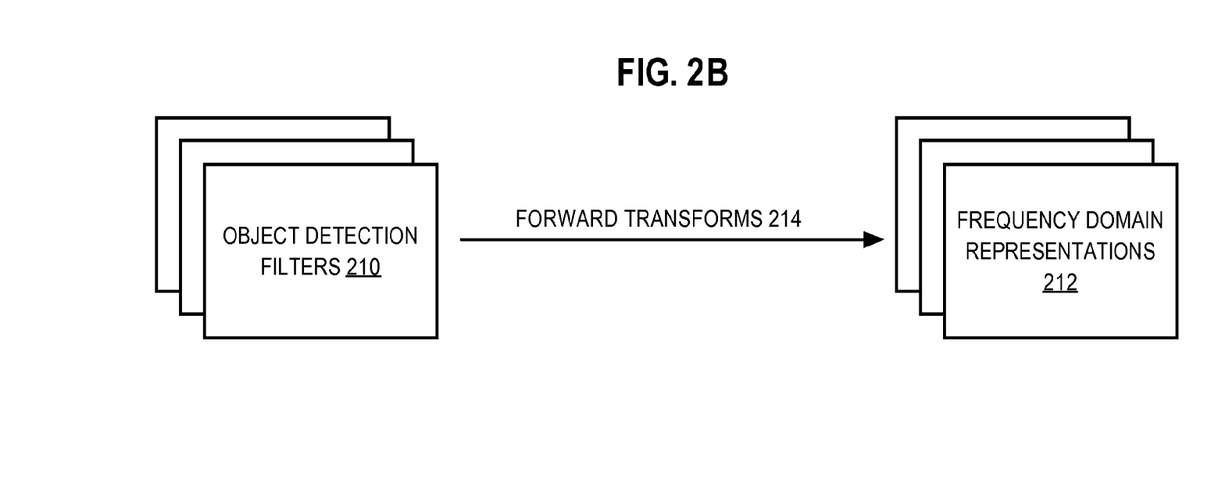
FIG. 2B depicts an example block diagram for obtaining frequency domain representations of object detection filters.

FIG. 2B depicts an example block diagram for obtaining frequency domain representations of object detection filters. In the example of FIG. 2B, frequency domain representations 212 are generated by performing forward transforms 214 on object detection filters 210. Forward transforms 214 may be of the same type as forward transform 208. For example, forward transforms 214 include, without limitation, Fourier transforms, Z-transforms, Hilbert transforms, Laplace transforms, Wavelet transforms, and/or any other means of obtaining one or more frequency domain representations 212 of one or more object detection filters 210. A wide variety of objection detection filters 210 may be used, depending upon a particular implementation and embodiments are not limited to any particular object detection filter. Example implementations of object detection filters 210 include, without limitation, a binary classifier, a learned filter, a matrix, a filter mask, and/or a kernel, such as a Gaussian kernel.

Figure 3:
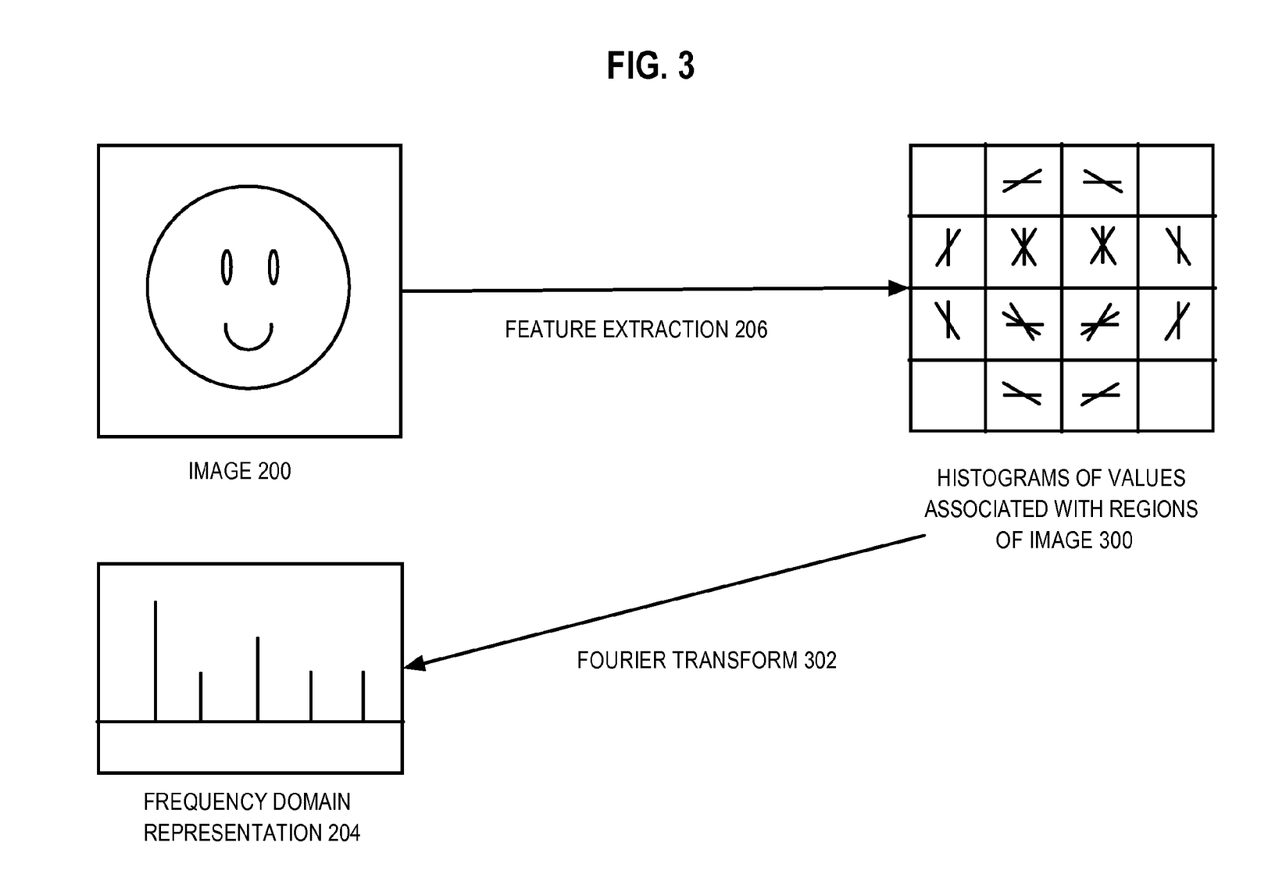
FIG. 3 depicts example details of obtaining a frequency domain representation associated with the image.

FIG. 3 depicts example details of obtaining a frequency domain representation associated with the image. In the example of FIG. 3, histograms of values associated with regions of image 300 are generated by performing feature extraction 206 on image 200. In the present example, image 200 depicts a picture of a person's face. Continuing with the present example, histograms of values associated with regions of image 300 are HOGs of image 200. In FIG. 3, the HOGs of image 200 depict gradient orientations that correspond to edge directions in sixteen cells of image 200. In addition, a frequency domain representation 204 is generated by performing a Fourier transform 302 on histograms of values associated with regions of image 300 in the example of FIG. 3. In the present example, frequency domain representation 204 depicts a graph obtained by performing a Fourier transform 302 on histograms of values associated with regions of image 300. In FIG. 3, the graph represents an aggregation of component frequencies across the frequency spectrum.

Generating a Composite Frequency Domain Representation

Figure 4:
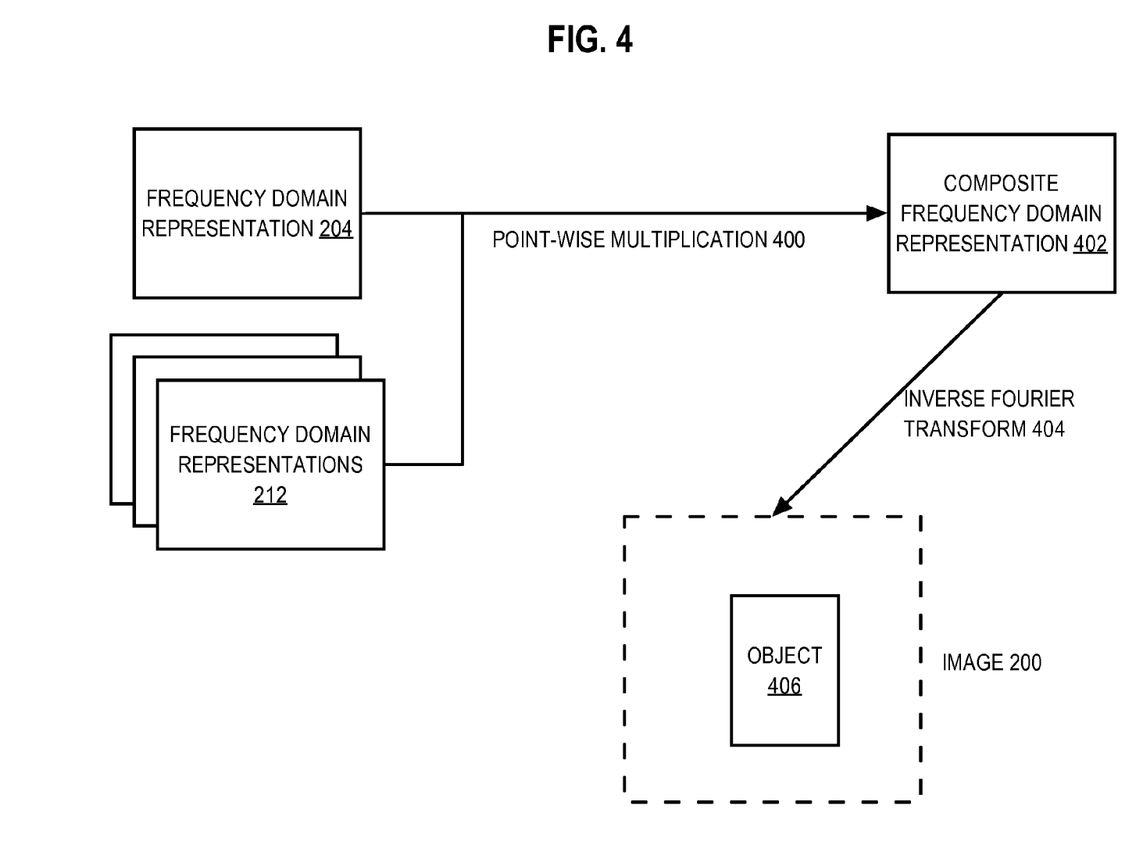
FIG. 4 is a block diagram that depicts an approach for generating a composite frequency domain representation and detecting an object in the image.

FIG. 4 is a block diagram that depicts an example approach for generating a composite frequency domain representation and detecting an object in the image. In the example of FIG. 4, a composite frequency domain representation 402 is generated by performing point-wise multiplication 400 on the frequency domain representation 204 of image feature description 202 and the frequency domain representations 212 of object detection filters 210. An object 406 is detected in image 200 by performing an inverse Fourier transform 404 on composite frequency domain representation 402.

Point-wise multiplication 400 may comprise a process of obtaining the point-wise product of the frequency domain representation 204 of image feature description 202 and one of the frequency domain representations 212 of object detection filters 210. Point-wise multiplication 400 may be equivalent to convolution in a domain other than the frequency domain. For example, point-wise multiplication 400 may be equivalent to convolution in the space domain.

To further illustrate, let f and g correspond to image feature description 202 and one of the object detection filters 210, respectively. Let * represent convolution, and let x denote multiplication. Additionally, F denotes Fourier transform 302, and $F^1$ denotes inverse Fourier transform 404.

$$F\{f*g\}=F\{f\} \times F\{g\}$$

$$f*g=F^{-1}\{F\{f\} \times F\{g\}\}$$

Composite frequency domain representation 402 may be represented as a matrix, a graph, and/or a mathematical expression. Composite frequency domain representation 402 may comprise the point-wise product of the frequency domain representation 204 of image feature description 202 and one of the frequency domain representations 212 of object detection filters 210. For example, if composite frequency domain representation 402 comprises a matrix, object 406 may be detected when one or more values in composite frequency domain representation 402 exceed a threshold value.

Object Detection

Object 406 may comprise a detection result that indicates the presence and/or location of one or more items of interest in image 200. Object 406 may be determined by performing a reverse transform on composite frequency domain representation 402. The reverse transform may comprise inverse Fourier transform 404, an inverse Z-transform, an inverse Hilbert transform, an inverse Laplace transform, and/or an inverse Wavelet transform. For example, inverse Fourier transform 404 may be used to generate the spatial domain representation of composite frequency domain representation 402.

However, the presence and/or location of one or more objects in image 200 may be detected without performing the reverse transform on composite frequency domain representation 402. For example, if composite frequency domain representation 402 comprises a matrix, the location(s) of the one or more values in the matrix that exceed a threshold value may indicate the location(s) of the one or more objects in image 200.

Figure 5:
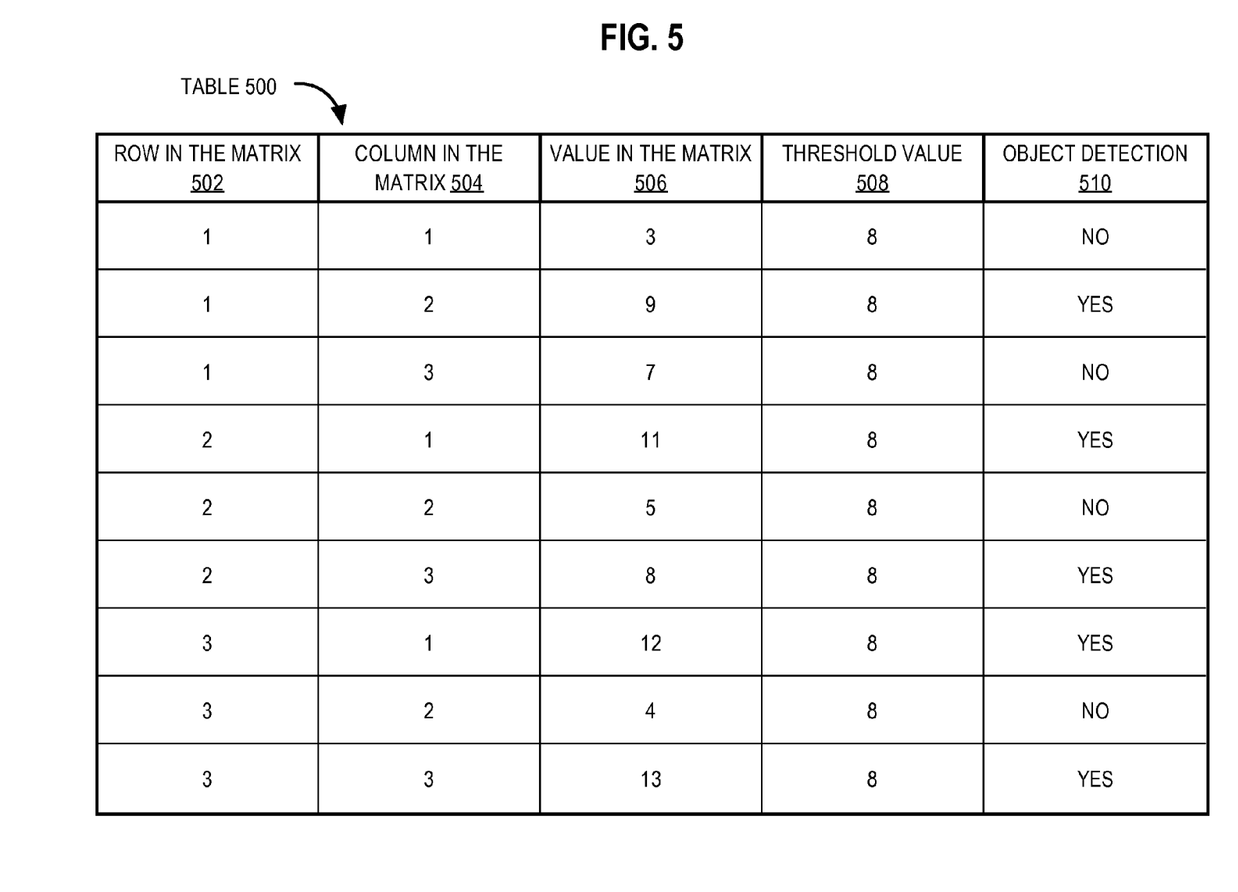
FIG. 5 is a table that depicts an approach for detecting an object based on values in a matrix that exceed a threshold value.

FIG. 5 is a table that depicts an approach for detecting an object based on values in a matrix that exceed a threshold value. In the example of FIG. 5, table 500 provides sample values for row in the matrix 502, column in the matrix 504, value in the matrix 506, threshold value 508, and object detection 510. Value in the matrix 506 may comprise one or more values associated with a pixel, cell, and/or block of cells in image 200. Threshold value 508 may comprise one or more values that may be the same or different. For example, in FIG. 5, value in the matrix 506 may comprise a single value associated with each pixel in image 200, and threshold value 508 may comprise a single value of 8 that is the same for each value in the matrix 506. Where object detection 510 indicates value in the matrix 506 exceeded threshold value 508, row in the matrix 502 and column in the matrix 504 may be used to determine the locations of object 406 in image 200.

Time Complexity

To establish a baseline for comparison, a sliding-window-based method that incorporates HOG exhibits a time complexity of O(kdxymn). This corresponds to the sum of convolutions across d feature dimensions, such as nine gradient directions, using k number of object detection filters 210. Typical object detection filters 210 will extract one or more features from every scale of an image pyramid to detect possible object locations in different scales and sizes. The sliding-window-based method must be applied multiple times when there are multiple object detection filters 210, and an increase in the value of d causes a corresponding linear growth in detection time. The dimensions of image 200 correspond to x and y, and the dimensions of one of object detection filters 210 correspond to m and n. The cost of a convolution in the space domain is O(xymn). Since k filters must be convolved and summed across d bins, the total number of operations at a specific scale is O(kdxymn).

In contrast, the time complexity of the approaches described herein may be represented by O(kdxy). This corresponds to a gain in image detection speed by a factor of O(mn). FFTs, which run in O(xy log(xy)) time, will be used for illustration.

The cost of the FFTs performed on the input signals may be O(dxy log(xy)). The FFT associated with image 200 may be performed once. FFTs associated with object detection filters 210 may be performed off-line, so there may be no impact to the overall detection time.

The cost of point-wise multiplication 400 may be O(kdxy). As with the sliding-window-based method, k filters may be convolved and summed across d bins for image 200 with dimensions x and y. However, the dimensions of object detection filters 210 may be irrelevant, because point-wise multiplication 400 may be performed on the entirety of image 200 at once.

The cost of inverse Fourier transform 404 may be O(kxy log(xy)). Since Fourier transform 302 is linear, the sum across different feature dimensions may be done prior to, concurrently with, and/or subsequent to inverse Fourier transform 404. If done before, inverse Fourier transform 404 may be performed once for each of the object detection filters 210 even if there are multiple planes.

Taking the aforementioned costs into account, the time complexity of the approach described herein may be represented by O(kdxy). O(dxy log(xy))+O(kdxy)+O(kxy log (xy)) ultimately resolves to O(kdxy). Thus, if the area of object detection filters 210 is ten, this may translate into a tenfold increase in detection speed.

Client-Server Model

Figure 6:
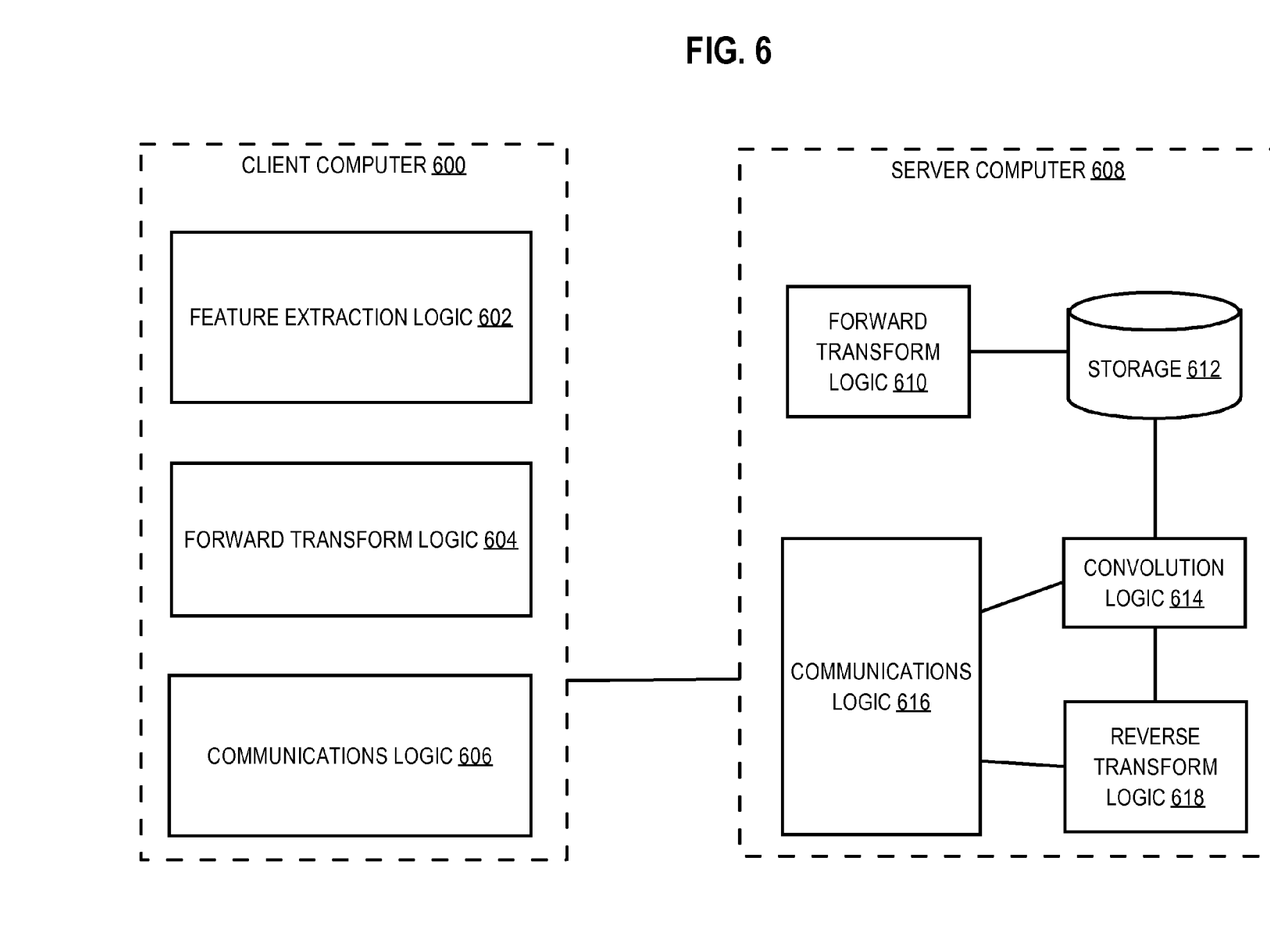
FIG. 6 depicts an example client-server computer architecture on which embodiments may be implemented.

FIG. 6 depicts an example client-server computer architecture on which embodiments may be implemented. In the example of FIG. 6, client computer 600 comprises feature extraction logic 602, forward transform logic 604, and communications logic 606. Client computer 600 is communicatively coupled to server computer 608, which comprises forward transform logic 610, storage 612, convolution logic 614, communications logic 616, and reverse transform logic 618.

While some of the aforementioned elements are depicted in FIG. 6 and described herein as if implemented on a separate, remote computer from each other, this is done for explanation purposes only and one or more of the elements may be part of and/or executed on the same computer. For example, feature extraction logic 602, forward transform logic 604, 610, storage 612, convolution logic 614, and/or reverse transform logic 618 may be executed on the same computer, local area network ("LAN"), and/or wide area network ("WAN").

Figure 7:
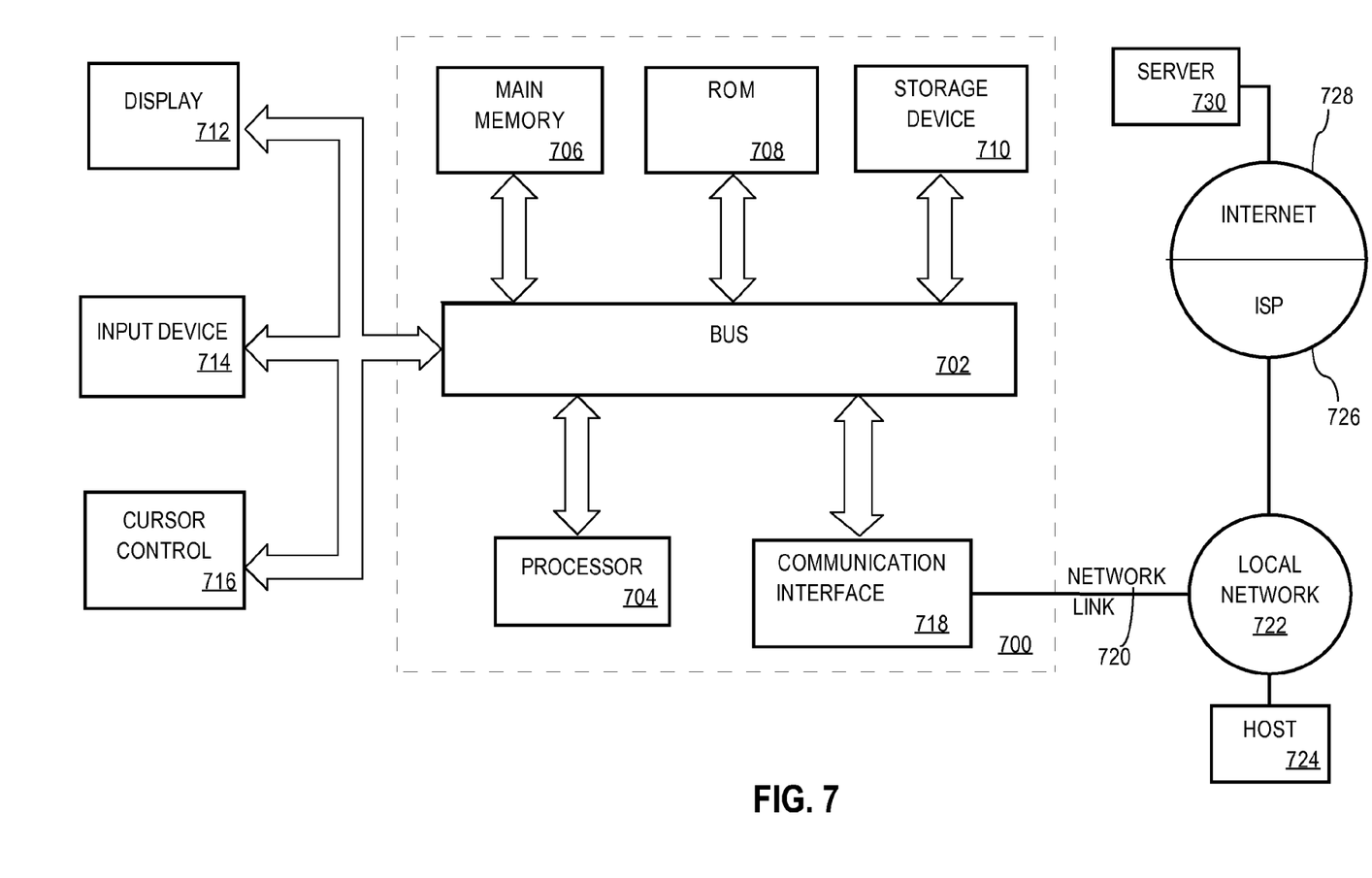
FIG. 7 depicts a computer system upon which an embodiment may be implemented.

In an embodiment, each of the logical and/or functional units of client computer 600 and server computer 608 may be implemented using any of the techniques further described herein in connection with FIG. 7. For example, client computer 600 or server computer 608 may comprise a general-purpose computer configured with one or more stored programs which when executed cause performing the functions described herein for client computer 600 or server computer 608; a special-purpose computer with digital logic that is configured to execute the functions; or digital logic that is used in other computing devices. While FIG. 6 includes lines that indicate various devices and/or modules being communicatively coupled, each of the computers, devices, modules, storage, and logic may be communicatively coupled with each other.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer may be a client and/or a server. Any reference to "a computer" herein may mean one or more computers, unless expressly stated otherwise.

Client computer 600 may be a desktop computer, a laptop computer, a smartphone, a tablet computer, a smart television, and/or any other networked computer that acts as a client. Client computer 600 may access and/or process image 200. For example, client computer 600 may download HyperText Markup Language ("HTML") containing a reference to image 200. Client computer 600 and/or feature extraction logic 602 may obtain and/or generate image feature description 202 and/or histograms of values associated with regions of image 300 by performing feature extraction 206 on image 200. Client computer 600 and/or forward transform logic 604 may obtain and/or generate frequency domain representation 204 by performing forward transform 208 and/or fourier transform 302 on image feature description 202 and/or histograms of values associated with regions of image 300. Additionally or alternatively, client computer 600 may obtain image feature description 202, histograms of values associated with regions of image 300, and/or frequency domain representation 204 from another computer.

Communications logic 606, 616 may comprise a network interface. Client computer 600, communications logic 606, 616, and/or server computer 608 may send and/or receive data over any standard or proprietary protocol. Client computer 600 and/or communications logic 606 may send image 200, data associated with image 200, image feature description 202, histograms of values associated with regions of image 300, and/or frequency domain representation 204 to server computer 608. Client computer 600 and/or communications logic 606 may receive data associated with object 406 detected in image 200 and/or a detection result.

Server computer 608 may comprise one or more server computers and/or one or more load balancers. Server computer 608 may comprise a networked computer that acts as a server to one or more clients, such as client computer 600. Server computer 608 may receive requests for data and may respond with data. Server computer 608 may be owned and/or managed by one or more independent entities and may span across one or more computer networks, such as the Internet. Additionally or alternatively, server computer 608 may respond with data that references data on server computer 608 and/or another computer.

Server computer 608 and/or forward transform logic 610 may obtain and/or generate one or more frequency domain representations by performing forward transforms 214 on one or more object detection filters. Server computer 608 and/or forward transform logic 610 may obtain and/or generate the one or more frequency domain representations prior to, concurrently with, and/or subsequent to receiving image 200, data associated with image 200, image feature description 202, histograms of values associated with regions of image 300, and/or frequency domain representation 204. Server computer 608 and/or forward transform logic 610 may store the one or more frequency domain representations in server computer 608 and/or storage 612.

Server computer 608 and/or storage 612 may be a database, a configuration file, and/or any other system and/or data structure that stores data. Storage 612 may be a separate computer from server computer 608. Additionally or alternatively, storage 612 may be a data structure stored in memory on the one or more computers comprising, at least in part, server computer 608. Additionally or alternatively, storage 612 may, at least in part, be a data structure stored in shared memory between one or more server computers. Additionally or alternatively, storage 612 may be, at least in part, non-volatile storage.

Server computer 608 and/or communications logic 616 may receive image 200, image feature description 202, histograms of values associated with regions of image 300, and/or frequency domain representation 204. Communications logic 616 may forward image 200, image feature description 202, histograms of values associated with regions of image 300, and/or frequency domain representation 204 to convolution logic 614. Server computer 608 and/or communications logic 616 may send data associated with object 406 detected in image 200 and/or a detection result to client computer 600 and/or communications logic 606.

Server computer 608 and/or convolution logic 614 may process image 200, image feature description 202, histograms of values associated with regions of image 300, and/or frequency domain representation 204; determine one or more appropriate object detection filters to be used to detect object 406 in image 200; obtain the one or more frequency domain representations associated with the one or more appropriate object detection filters; detect object 406 based on one or more values in the matrix that exceed a threshold value 508; and/or generate and/or send data associated with object 406 detected in image 200 to client computer 600 and/or communications logic 616. For example, server computer 608 and/or convolution logic 614 may determine the one or more appropriate object detection filters based on data generated by one or more preliminary assessment filters and/or one or more other object detection filters in a previous analysis. Server computer 608 and/or convolution logic 614 may obtain and/or generate composite frequency domain representation 402 by performing point-wise multiplication 400 on a plurality of frequency domain representations comprising frequency domain representation 204 and the one or more frequency domain representations associated with the one or more object detection filters.

Server computer 608 and/or optional reverse transform logic 618 may detect object 406 by performing a reverse transform and/or inverse Fourier transform 404 on composite frequency domain representation 402. Server computer 608 and/or optional reverse transform logic 618 may generate and/or send data associated with object 406 detected in image 200 and/or a detection result to client computer 600 and/or communications logic 616.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that depicts a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory storage media storing instructions which, when processed by one or more computing devices, cause:
    obtaining a frequency domain representation associated with an image;
    obtaining one or more frequency domain representations of one or more object detection filters;
    generating a composite frequency domain representation based on the frequency domain representation associated with the image and the one or more frequency domain representations of the one or more object detection filters; and
    detecting one or more objects in the image based on the composite frequency domain representation.

2. The one or more non-transitory storage media of claim 1 wherein the obtaining a frequency domain representation associated with an image comprises:
    obtaining an image feature description based on a feature extraction performed on the image; and
    obtaining the frequency domain representation associated with the image based on a forward transform performed on the image feature description.

3. The one or more non-transitory storage media of claim 1 wherein the one or more frequency domain representations of the one or more object detection filters are obtained based on one or more Fourier transforms performed on the one or more object detection filters.

4. The one or more non-transitory storage media of claim 1 wherein the composite frequency domain representation is generated by performing a point-wise multiplication on the frequency domain representation associated with the image and the one or more frequency domain representations of the one or more object detection filters.

5. The one or more non-transitory storage media of claim 1 wherein the composite frequency domain representation comprises a matrix that is used to detect the one or more objects when one or more values in the matrix exceed a threshold value.

6. The one or more non-transitory storage media of claim 1 wherein the detecting one or more objects comprises performing an inverse Fourier transform on the composite frequency domain representation.

7. The one or more non-transitory storage media of claim 1 wherein a processing time has an upper bound that is determined by multiplying dimensions of the image, a number of object detection filters, and feature dimensions.

8. The one or more non-transitory storage media of claim 2 wherein the image feature description comprises one or more histograms of values associated with one or more regions of the image.

9. A method comprising:
    obtaining a frequency domain representation associated with an image;
    obtaining one or more frequency domain representations of one or more object detection filters;
    generating a composite frequency domain representation based on the frequency domain representation associated with the image and the one or more frequency domain representations of the one or more object detection filters; and
    detecting one or more objects in the image based on the composite frequency domain representation;

wherein the method is performed by one or more computing devices.

10. The method of claim 9 wherein the obtaining a frequency domain representation associated with an image comprises:
obtaining an image feature description based on a feature extraction performed on the image; and
obtaining the frequency domain representation associated with the image based on a forward transform performed on the image feature description.

11. The method of claim 9 wherein the one or more frequency domain representations of the one or more object detection filters are obtained based on one or more Fourier transforms performed on the one or more object detection filters.

12. The method of claim 9 wherein the composite frequency domain representation is generated by performing a point-wise multiplication on the frequency domain representation associated with the image and the one or more frequency domain representations of the one or more object detection filters.

13. The method of claim 9 wherein the composite frequency domain representation comprises a matrix that is used to detect the one or more objects when one or more values in the matrix exceed a threshold value.

14. The method of claim 9 wherein the detecting one or more objects comprises performing an inverse Fourier transform on the composite frequency domain representation.

15. The method of claim 9 wherein a processing time for the method has an upper bound that is determined by multiplying dimensions of the image, a number of object detection filters, and feature dimensions.

16. The method of claim 10 wherein the image feature description comprises one or more histograms of values associated with one or more regions of the image.

17. An apparatus comprising:
one or more processors; and
one or more non-transitory storage media storing instructions which, when processed by the one or more processors, cause:
obtaining a frequency domain representation associated with an image;
obtaining one or more frequency domain representations of one or more object detection filters;
generating a composite frequency domain representation based on the frequency domain representation associated with the image and the one or more frequency domain representations of the one or more object detection filters; and
detecting one or more objects in the image based on the composite frequency domain representation.

18. The apparatus of claim 17 wherein the obtaining a frequency domain representation associated with an image comprises:
obtaining an image feature description based on a feature extraction performed on the image; and
obtaining the frequency domain representation associated with the image based on a forward transform performed on the image feature description.

19. The apparatus of claim 17 wherein the one or more frequency domain representations of the one or more object detection filters are obtained based on one or more Fourier transforms performed on the one or more object detection filters.

20. The apparatus of claim 17 wherein the composite frequency domain representation is generated by performing a point-wise multiplication on the frequency domain representation associated with the image and the one or more frequency domain representations of the one or more object detection filters.

21. The apparatus of claim 17 wherein the composite frequency domain representation comprises a matrix that is used to detect the one or more objects when one or more values in the matrix exceed a threshold value.

22. The apparatus of claim 17 wherein the detecting one or more objects comprises performing an inverse Fourier transform on the composite frequency domain representation.

23. The apparatus of claim 17 wherein a processing time has an upper bound that is determined by multiplying dimensions of the image, a number of object detection filters, and feature dimensions.

24. The apparatus of claim 18 wherein the image feature description comprises one or more histograms of values associated with one or more regions of the image.

* * * * *